3,355,469
ALKYLAMIDO(DIALKYL)TIN CARBOXYLATES AND THE METHOD OF PREPARING THEM

Sheldon Herbstman, Bronx, N.Y., assignor to Stauffer Chemical Company, New York, N.Y., a corporation of Delaware
No Drawing. Filed Apr. 9, 1964, Ser. No. 358,620
12 Claims. (Cl. 260—429.7)

This invention relates to organotin compounds and in particular to alkylamidodialkyltin carboxylates. The invention also pertains to the method of preparing the aforenamed compounds.

In accordance with the present invention, it has been discovered that a disubstituted organotin oxide such as a dialkyltin oxide undergoes a new and novel reaction with imides whereby there is engendered a hitherto unknown family of organotin compounds. The structural configuration of these new chemical entities, as ascertained by infra-red and elemental analysis, can be depicted and illustrated by the following formulae:

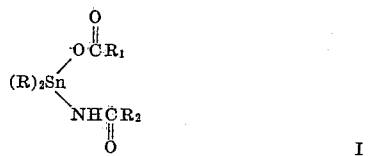

and

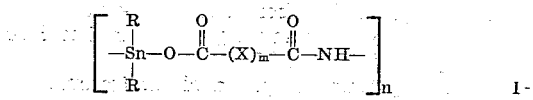

wherein R is an alkyl radical of from 1 to 8 carbon atoms as typified by methyl, ethyl, n-propyl, n-butyl, isobutyl, n-pentyl, isopentyl, isohexyl, n-heptyl and isooctyl; $R_1$ and $R_2$, which may be identical or not, represent alkyl radicals each having from 1 to 18 carbon atoms as typified by methyl, ethyl, n-propyl, n-butyl, isobutyl, n-pentyl, isopentyl, isohexyl, n-heptyl, isooctyl, n-nonyl, n-decyl, undecyl, dodecyl, tridecyl, tetradecyl, pentadecyl, hexadecyl, heptadecyl and octadecyl; X is an alkylene bridge, $m$ is an integer of from 2 to 8, and $n$ is an integer of from 5 to 25.

As can be seen from an inspection of the chemical equation outlined below, the imide and dialkyltin oxide react additively, the sole product being the alkylamidodialkyltin carboxylate:

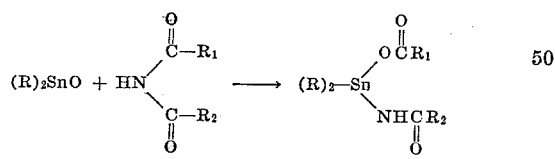

wherein R, $R_1$ and $R_2$ have the significance as previously designated. Polymeric organotin compounds of the type contemplated by Formula II are formed by using an imide component in which $R_1$ and $R_2$ are connected to form an imide ring system such as succinimide, phthalimide or the like.

That the reaction of a dialkyltin oxide with an organic imide should proceed in the manner above shown is indeed surprising. Normally a compound having an acidic hydrogen, condenses with the dialkyltin oxide to split out water from between the reactants while the tin becomes bound to the atom bearing the acidic hydrogen. Since an imide contains an acidic hydrogen, it would be expected to behave analogously to other acidic adjuncts toward dialkyltin oxide. Yet a totally different type of reaction has been shown to occur.

In preparing the new type of organotin compounds of the invention, it has been my finding that they can be generally realized by bringing together the imide and dialkyltin oxide preferably under the influence of moderately elevated temperatures. The so-formed alkylamidodialkyltin carboxylates are then isolated and purified by any of the techniques commonly employed in the practice of organic chemistry. The purified products are for the most part white crystalline solids, although in the case of the polymeric types there may be a tendency toward amorphousness.

A particularly convenient procedure for preparing the alkylamidodialkyltin carboxylates consists in heating the requisite dialkyltin oxide and organic imide in the presence of an organic solvent. The reaction is preferably conducted at reflux temperature. As a desirable reaction media, the relatively inert normally liquid organic solvents such as the aromatic and saturated aliphatic hydrocarbons and their liquid chlorinated derivatives have proven especially satisfactory. Specific solvents include toluene, benzene, n-heptane, chlorobenzene, m-dichlorobenzene, carbon tetrachloride and the like. It is to be understood, however, that a solvent is not absolutely necessary and in fact may be dispensed with entirely, the reactants themselves serving as the reaction media. Generally speaking, the reaction is performed in the temperature range of from about 80° C. to about 150° C.

As previously pointed out, the structure of the alkylamidodialkyltin carboxylates of the invention was elucidated by means of elemental analysis as well as by infrared spectroscopy which indicated the bi-functional nature of the compounds, i.e. a carboxylic ester group and an alkylamido group bound to a tin atom. There is, however, another factor which supports the chemical configuration assigned to these new organotin derivatives—their synthesis is not accompanied by the formation of water which is an inevitable by-product when an acidic component reacts with a dialkyltin oxide in the normal manner.

Aside from their novel chemical make-up, the new and novel organotin compounds of the invention are possessed of practical utility, and in this connection it has been discovered that they are effective as catalysts in formulating polyurethane foams based on the "one-shot" technique.

Reference is now made to the following examples which are inserted for the purpose of illustrating the invention without placing any limitation thereon.

EXAMPLE 1

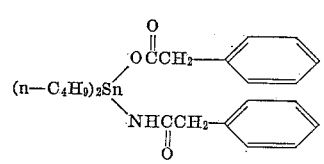

A mixture of 6.33 g. (0.033 mole) of di-n-butyltin oxide and 6.30 g. (0.033 mole) of 2,2'-diphenyldiacetamide was refluxed in toluene for approximately two hours. Although the apparatus was equipped with a Dean-Stark trap to collect water given off by the reaction, no trace of moisture was detected. After refluxing had proceeded for about 15 minutes, all of the dibutyltin oxide had undergone dissolution. Following the two-hour reflux period, the toluene was distilled from the reaction mixture in vacuo leaving 12.0 g. of a white residue. The crude material was crystallized from acetone whereby there was obtained 82.5% of purified product having a melting point of 160° C. The analytical data was as follows: Sn calc., 23%; Sn found, 22.4%.

EXAMPLE 2

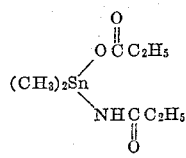

Using the procedure as above given for Example 1, a mixture of 9.0 g. (0.054 mole) of dimethyltin oxide, 6.97 g. (0.054 mole) of dipropionamide and 150 ml. of toluene was refluxed for eleven hours, after which period all solid material had dissolved. The hot toluent solution was filtered and on cooling produced a white crystalline solid precipitate which was filtered off and dried, weight 14.0 g. After crystallization from toluene, there was obtained 10.0 g. (69.0% of theory) of purified product which melted at 190–192° C.

*Analysis.*—Calc.: Sn, 40.5%. Found: Sn, 38.0%.

EXAMPLE 3

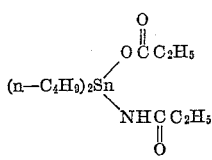

The procedure of Example 1 was again carried out but using 24.5 g. (0.10 mole) of di-n-butyltin oxide and 12.6 g. (0.10 mole) of dipropionamide in 300 ml. of toluene. There was obtained 32.0 g. (86.0% of theory) of a white crystalline product, the chemical and infra-red analysis of which was in conformity with the above depicted structure. The melting point of the product was 30.0° C.

EXAMPLE 4

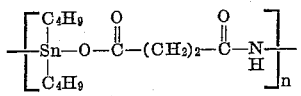

A slurry containing 24.6 g. (0.10 mole) of di-n-butyltin oxide and 10.0 g. (0.10 mole) of succinimide in 250 ml. of toluene was heated under reflux until there was obtained a clear solution. The period required to effect complete dissolution of the reactants amounted to approximately six hours. Upon cooling the reaction mixture, there was formed a white crystalline solid which on crystallization from toluene yielded 29.5 g. (81% of theory) of a purified product having a melting point of 250° C. (dec.). The high melting point and insolubility in such common organic solvents as diethylether, hexane and acetone indicated the polymeric nature of the product. The use of a closed imide system such as succinimide leads to a polymeric structure.

*Analysis.*—Calc.: Sn, 35.7%. Found: Sn, 36.4%. The molecular weight corresponded to a value of $n$ ranging from about 5 to 25.

EXAMPLE 5

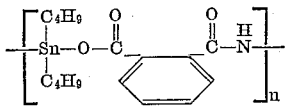

The procedure of Example 4 was repeated but using as the closed imide intermediate 15.5 g. (0.10 mole) of phthalimide while the dialkyltin oxide component was 24.6 g. (0.10 mole) of di-n-butyltin oxide. The product obtained in this preparation was a white solid which after crystallization from toluene melted above 300° C. The product was shown to be polymeric in nature, the value of $n$ being in the vicinity of from 5 to 25.

I claim:
1. An organotin compound selected from the class consisting of:

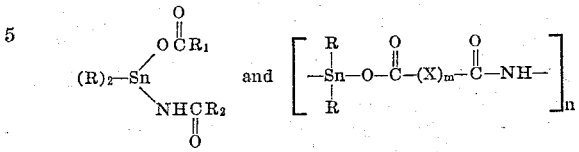

wherein R is alkyl of from 1 to 8 carbon atoms, $R_1$ and $R_2$ are each selected from the class consisting of an alkyl radical of from 1 to 18 carbon atoms, phenyl and naphthyl, X is an alkylene bridge, $m$ is an integer of from 2 to 8 and $n$ is an integer of from 5 to 25.

2. An organotin compound of the formula:

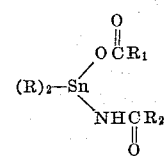

wherein R is alkyl of from 1 to 8 carbon atoms, $R_1$ and $R_2$ are each selected from the class consisting of an alkyl radical of from 1 to 18 carbon atoms, phenyl and naphthyl.

3. An organotin compound of the formula:

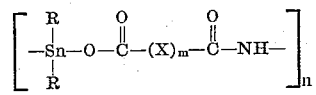

wherein R is alkyl of from 1 to 8 carbon atoms, X is an alkylene bridge, $m$ is an integer of from 2 to 8 and $n$ is an integer of from 5 to 25.

4. An organotin compound of the formula:

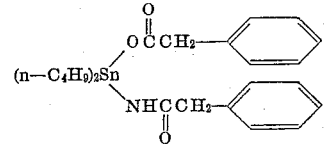

5. An organotin compound of the formula:

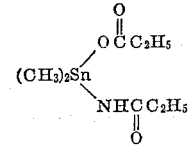

6. An organotin compound of the formula:

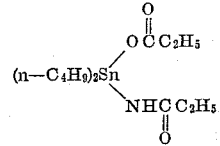

7. An organotin compound of the formula:

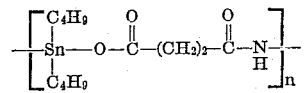

wherein $n$ is an integer of from 5 to 25.

8. An organotin compound of the formula:

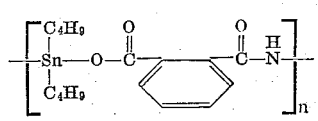

wherein $n$ is an integer of from 5 to 25.

9. A process of preparing an organotin compound selected from the class consisting of:

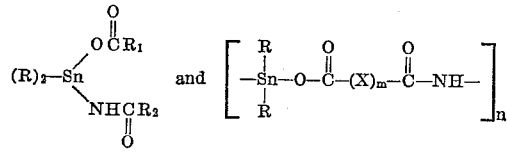

wherein R is alkyl of from 1 to 8 carbon atoms, $R_1$ and $R_2$ are each selected from the class consisting of an alkyl radical of from 1 to 18 carbon atoms, phenyl and naphthyl, X is an alkylene bridge, $m$ is an integer of from 2 to 8 and $n$ is an integer of from 5 to 25, which comprises reacting a dialkyltin oxide of the formula $(R)_2SnO$ with an imide of the formula:

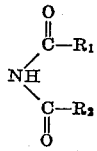

wherein R, $R_1$ and $R_2$ have the above designated significance, while taken together $R_1$ and $R_2$ can form an imide ring system, and isolating the so-obtained organotin compound.

10. The process according to claim 9 wherein the reaction is carried out in the presence of a relatively inert normally liquid organic solvent.

11. The process according to claim 10 wherein the reaction is carried out under reflux.

12. The process according to claim 9 wherein the reaction is carried out at a temperature of from about 80° C. to about 150° C.

References Cited
UNITED STATES PATENTS 3,053,870   9/1962   Lynn et al. _____ 260—429.7
3,311,647   3/1967   Stamm _____ 260—429.7

TOBIAS E. LEVOW, *Primary Examiner.*

W. F. W. BELLAMY, *Assistant Examiner*